(12) United States Patent
Bouchet et al.

(10) Patent No.: US 7,347,399 B2
(45) Date of Patent: Mar. 25, 2008

(54) AIRCRAFT PARTITION DESIGNED TO SEPARATE A CARGO PART FROM A COCKPIT OR FROM A PASSENGER COMPARTMENT

(75) Inventors: Eric Bouchet, Aussonne (FR); Benjamin Mahieu, Toulouse (FR); Lionel Juillen, Toulouse (FR); Frederic Vinches, Larra (FR)

(73) Assignee: Airbus France, Toulouse (FR)

( * ) Notice: Subject to any disclaimer, the term of this patent is extended or adjusted under 35 U.S.C. 154(b) by 478 days.

(21) Appl. No.: 10/978,471

(22) Filed: Nov. 2, 2004

(65) Prior Publication Data

US 2005/0116102 A1    Jun. 2, 2005

(30) Foreign Application Priority Data

Nov. 24, 2003   (FR)   .................................. 03 50893

(51) Int. Cl.
*B64C 1/10*   (2006.01)
*E04C 2/36*   (2006.01)

(52) U.S. Cl. ..................... 244/121; 52/793.11

(58) Field of Classification Search ................ 244/119, 244/120, 121, 129.4, 133; 52/783.1, 784.14, 52/793.1, 793.11; 410/87; 428/119
See application file for complete search history.

(56) References Cited

U.S. PATENT DOCUMENTS

| 5,084,120 | A  | * | 1/1992 | Fischer et al. .............. 156/233 |
| 5,085,382 | A  |   | 2/1992 | Finkenbeiner |
| 5,736,221 | A  | * | 4/1998 | Hardigg et al. ............. 428/116 |
| 6,454,211 | B2 | * | 9/2002 | Entelmann et al. ...... 244/129.5 |
| 7,074,474 | B2 | * | 7/2006 | Toi et al. .................... 428/102 |
| 2001/0015043 | A1 |   | 8/2001 | Brenneis et al. |
| 2006/0037281 | A1 | * | 2/2006 | Yong et al ............... 52/784.14 |

FOREIGN PATENT DOCUMENTS

GB   824 823       12/1959
RU   2 144 469 C1   1/2000

\* cited by examiner

*Primary Examiner*—Rob Swiatek
(74) *Attorney, Agent, or Firm*—Oblon, Spivak, McClelland, Maier & Neustadt, P.C.

(57) ABSTRACT

A partition for an aircraft is designed to separate a cargo part from a cockpit or a passenger compartment of this aircraft. The partition includes a cellular central structure in contact with a first external wall and a second external wall of this partition. The partition also includes several stiffener elements added onto at least one of the first and second external walls. The invention also relates to an aircraft including at least one such partition.

17 Claims, 4 Drawing Sheets

AIRCRAFT PARTITION DESIGNED TO SEPARATE A CARGO PART FROM A COCKPIT OR FROM A PASSENGER COMPARTMENT

TECHNICAL DOMAIN

This invention relates in general to the domain of devices for separation of a cargo part and a cockpit or passenger compartment of an aircraft used to transport freight. More particularly, the invention relates to a partition to be inserted between a cargo part and a cockpit or a passenger compartment of an aircraft, and comprising a central cellular structure in contact with a first external wall and a second external wall of this partition.

STATE OF PRIOR ART

In an aircraft designed and used to transport freight in a cargo part, there is usually a separation device between this cargo part and the cockpit of the aircraft when this aircraft is used entirely as a cargo aircraft, or a separation device between this same cargo part and a passenger compartment when the aircraft concerned is for mixed use, namely to transport freight and passengers.

In a known manner, the purpose of the separation device is to protect passengers or members of the crew depending on the configuration of the aircraft concerned, being designed to stop the transported load when it is subjected to an acceleration less than or equal to a maximum acceleration expected in the flight domain of this aircraft.

Several solutions have been proposed according to prior art for making such a separation device.

A first solution consisted firstly of designing a net to retain the freight to stop it from entering the cockpit or the passenger compartment when this transported load is accelerated, particularly as described in document U.S. Pat. No. 6,244,803.

However, there is a serious disadvantage with this solution, which is that the net can deform significantly under the effect of forces applied by the transported load retained by this net when this load is accelerated. For example, this deformation may be as much as several tens of centimetres in a wide body carrier transporting heavy loads. Thus, it is clear that the part of the cockpit or passenger compartment into which the net can deform due to forces transmitted by the transported load retained by the net, cannot be used usefully. Consequently, the use of such a net results in non-optimised space being taken up in the cockpit or the passenger compartment of the aircraft.

To overcome this problem, another solution has been proposed consisting of replacing the net by a rigid partition with small deformation, of the metallic plate type with a relatively large thickness. However, although this partition can advantageously reduce the space occupied directly as a result of use of the separation device, its mass is significantly greater than the mass of the initial solution of a net. Furthermore, it is obvious that as the transported load increases, the mass of the partition must also increase, which means that this solution is not very satisfactory.

Moreover, some partitions have been provided with a cellular structure, for example by arranging the structure between two outside walls of the partition, in order to reduce the mass of the separation device, and particularly with the obvious purpose of being able to increase the transported load.

However, mainly when the aircraft concerned is a wide body carrier and the freight being transported is heavy, the mass of the partition with a cellular structure is still relatively high due to the mechanical strength that it needs to protect crew members located in the cockpit, or passengers inside their compartment.

PRESENTATION OF THE INVENTION

Therefore, the purpose of the invention is to propose a partition for an aircraft designed to separate a cargo part from a cockpit or from a passenger compartment in this aircraft, this partition at least partially solving the disadvantages mentioned above with embodiments according to prior art.

The purpose of this invention is also to present an aircraft with at least one such partition.

To achieve this, the first purpose of the invention is a partition for an aircraft designed to separate a cargo part from a cockpit or a passenger compartment of this aircraft, this partition comprising a central cellular structure in contact with a first external wall and a second external wall of the partition. According to the invention, the partition also comprises several stiffener elements added onto at least either the first or second external wall.

Advantageously, the addition of stiffener elements on the external wall(s) of the partition according to the invention means that the partition has a higher global mechanical strength than is possible with a simple partition according to prior art, with an identical or similar external cellular structure and walls.

Consequently, this advantageous characteristic according to the invention can be used particularly to design a partition with lower mass than a simple partition according to prior art, while being capable of protecting the occupants of the aircraft from the same transported load. For the same mechanical strength to forces transmitted by the freight in bearing and during acceleration, the solution proposed by the invention using stiffener elements enables the use of a lighter weight central cellular structure due to the use of cells with larger dimensions and defined by thinner partition elements.

This is due to the fact that the mass of added stiffener elements is much less than the mass of material saved due to the increase in the size of the cells and the reduction of the thickness of partition elements, and possibly also the reduction of the thickness of the external walls.

Note that the various geometric parameters of the partition according to the invention, such as the dimensions and the location of stiffener elements or the size of the cells, are determined so as to obtain a sufficiently strong partition to resist the maximum transported load subjected to an acceleration equal to at least the maximum acceleration to which it may be subjected within the defined flight range for the aircraft concerned.

As an illustrative example, knowing the maximum forces to be resisted and the dimensions of the partition, the different characteristics of the partition may be determined analytically by carrying out successive calculations, for example using the finite element method, or a topological optimisation method.

Furthermore, the partition according to this invention has the advantage of having extremely low deformations similar to those achieved in prior art with a conventional cellular structure partition, these deformations being much less than the deformations obtained with a net solution. Consequently, the size of the cockpit of the aircraft or the passenger compartment of this aircraft may be significantly optimised.

Preferably, the first and second external walls are each in the form of a plane plate, and each stiffener element is in the form of a strip installed fixed on either the first or second external wall.

It would also be possible for each stiffener element to extend approximately along the direction of the height of the partition, matching either the first or second external wall.

Also preferably, each stiffener element is installed to be fixed on an internal surface of either the first or second external wall of the partition.

Preferably, the central cellular structure of the partition is made using partition elements each in the form of a plate, these partition elements being arranged approximately parallel to and perpendicular to each other.

At least one secondary stiffener element is added onto at least one of these partition elements, in order to provide better resistance to buckling and even further reduce the thickness of the partition elements and the total mass of this partition.

Finally the partition and preferably all its component elements, is made from aluminium or one of its alloys.

Another purpose of the invention is an aircraft comprising at least one partition separating a cargo part from a cockpit or a passenger compartment of this aircraft, at least one partition separating a cargo part from the cockpit or a passenger compartment being a partition like that presented above and also a subject of this invention.

Preferably, at least one partition separating a cargo part from the cockpit or a passenger compartment is fixed to the fuselage of this aircraft only by an upper edge and a lower edge of the partition. The advantage of this specific feature is that it reduces forces transmitted to the fuselage by the attachment devices used.

Other advantages and characteristics of the invention will become clear in the detailed non-limitative description given below.

BRIEF DESCRIPTION OF THE DRAWINGS

This description will be given with reference to the attached drawings among which.

DETAILED PRESENTATION OF PREFERRED EMBODIMENTS

Figure 1:
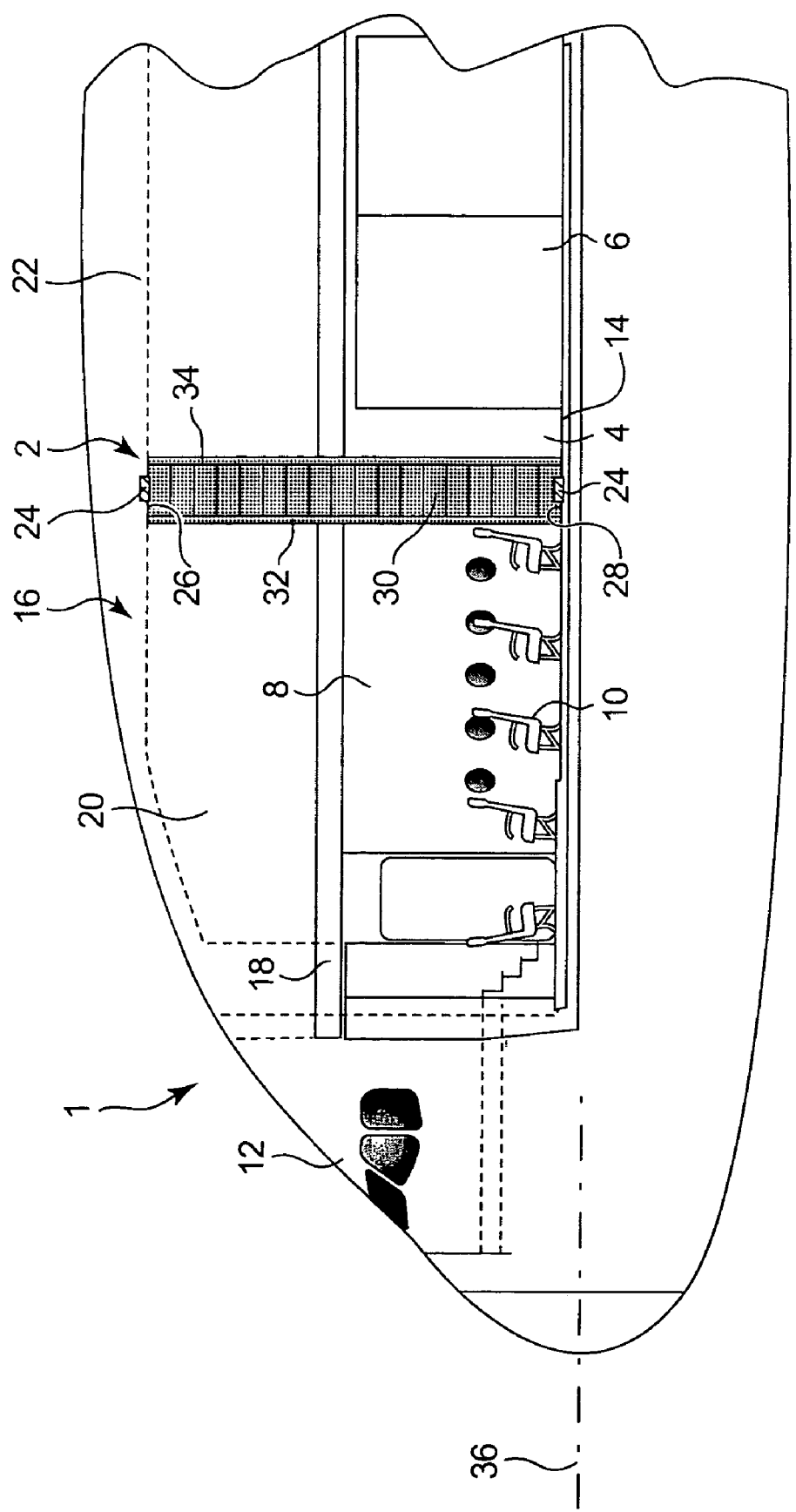
FIG. 1 shows a partial diagrammatic view of the side of an aircraft comprising a partition according to a first preferred embodiment of this invention, this partition separating a cargo part from a passenger compartment.

FIG. 1 shows an aircraft 1 for mixed use, namely designed to transport both freight and passengers, this aircraft 1 being equipped with a partition 2 according to a preferred embodiment of this invention.

As mentioned above, note that the aircraft 1 is also a subject of this invention. In the preferred example presented in FIG. 1, the aircraft 1 is designed such that the partition 2 is inserted between a cargo part 4 inside which the freight 6, also called the transported load, may be placed, and a passenger compartment 8 forwards from the cargo part 4 and provided with several seats 10. Obviously, in a case not shown in which the aircraft 1 is designed solely to transport freight 6, and therefore does not have a passenger compartment 8, the partition 2 will be placed between the cargo part 4 and the cockpit 12 adjacent to it.

As can be seen in FIG. 1, the partition 2 extends vertically between a main floor 14 and an upper part of a fuselage 16 of the aircraft 1, passing through an intermediate floor 18 parallel to and above the main floor 14. In this respect, note that in the description the terms "vertical" and "horizontal" mean perpendicular to and parallel to the main floor 14 of the aircraft 1, respectively.

Naturally, the partition 2 could only extend between the main floor 14 and the intermediate floor 18 both delimiting the cargo part 4 and the passenger compartment 8, or it could extend only between this intermediate floor 18 and the top part of the fuselage 16, without going outside the scope of the invention. On the other hand, in the preferred example shown in FIG. 1 in which the partition 2 extends beyond the intermediate floor 18, the portion of this partition 2 arranged between this intermediate floor 18 and the fuselage 16 separates two compartments 20 and 22 that could be used to store freight 6, in the same way as the previously described cargo part 4. In this respect, note that it would also be possible to provide two separate partitions 2 designed to equip each of the two levels separated by the intermediate floor 18, respectively. In this case, the two partitions 2 would obviously not necessarily be superposed in height.

In order to firmly fix the partition 2 to the rest of the aircraft structure 1, attachment devices 24 are provided between this partition 2 and particularly the fuselage 16. The devices 24 may for example include mechanical stops installed using bolts onto rails perpendicular to the partition 2 and fixed to it. These stops are then preferably designed to rest in contact with the fuselage 16 or the main floor 14, and are assembled to one of these elements 14, 16, also using bolts.

Thus, in order to reduce the forces transmitted to the fuselage 16 by the attachment devices 24, it would be possible for the partition 2 to be fixed only at its upper edge 26 to the top part of the fuselage 16, and at its lower edge 28 to the main floor 14.

Still with reference to FIG. 1, the partition 2 comprises a cellular central structure 30 in contact firstly with a first external wall of the partition 32 delimiting the passenger compartment 8, and secondly with a second external wall of the partition 34 delimiting the cargo part 4 of the aircraft 1.

In this respect, note that the two external walls 32 and 34 and the cellular central structure 30 are vertical, arranged superposed along a longitudinal direction of the aircraft 1 shown diagrammatically by axis 36, and each is in the form of a plane layer perpendicular to this longitudinal direction 36 of the aircraft 1.

The special feature of this partition 2 is due to the fact that it also comprises several stiffener elements (not shown in FIG. 1), added onto at least one of the first and second external walls 32 and 34. However, in the preferred embodiment of this invention shown in more detail in FIG. 2, the stiffener elements are only provided on the external wall 34 of this partition 2, namely on the back wall delimiting the cargo part 4. Naturally, these stiffener elements, designed to increase the global mechanical strength of the partition 2 so that it can resist the forces applied by the freight 6 in bearing and subjected to acceleration, could also be added onto the external wall 32 of the partition 2, namely on the front wall delimiting the passenger compartment 8, without going outside the scope of the invention.

Figure 2:
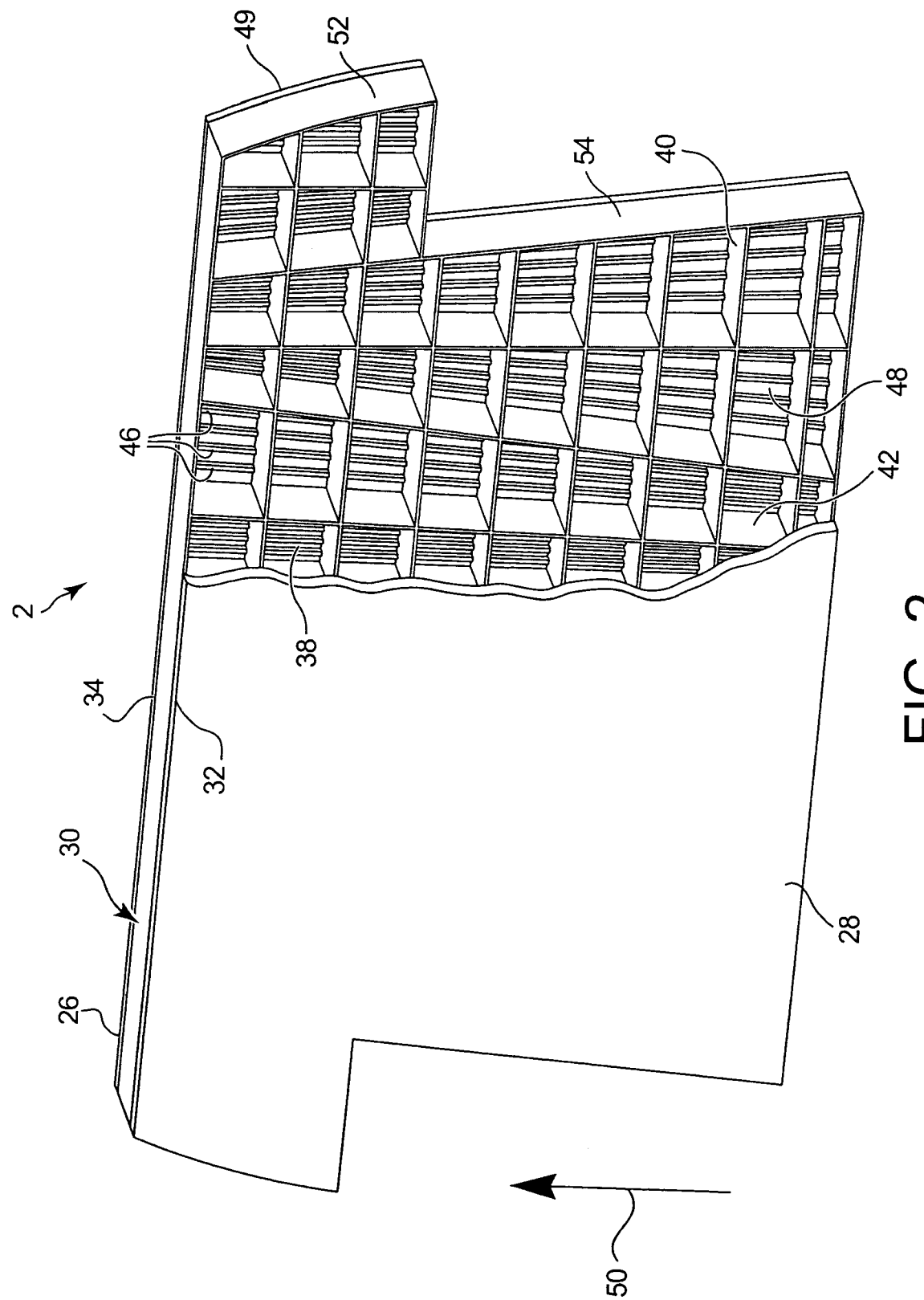
FIG. 2 shows a perspective view of the partition shown in FIG. 1.

FIG. 2 clearly shows that the external walls 32 and 34 are each preferably in the form of a plane plate, for example made of aluminium or one of its alloys. Nevertheless, these walls 32 and 34 may be made from any other rigid material without going outside the scope of the invention. Naturally, the periphery of these external walls 32 and 34 are defined so as to correctly match particularly the fuselage 16 and the main floor 14 of the aircraft 1. In this respect, it can be seen that the external walls 32, 34 and the central cellular structure 30 each have an approximately rectangular lower portion designed to delimit the cargo part 4 from the passenger compartment 8, and a longer upper portion approximately in the form of a segment of a disk in order to separate the two upper chambers 20 and 22. Note for guidance, that the lower portion of the partition 2 is narrowed at its two sides in order to be able to install doors (not shown) for communication between the cargo part 4 and the passenger compartment 8 of the aircraft 1.

Moreover, still with reference to FIG. 2, it can be seen that the central cellular structure 30 defines several cells 38, by means of partition elements 40 and 42 arranged approximately parallel to and perpendicular to each other. In this preferred embodiment of this invention, horizontal partition elements 40 are provided that preferably extend over the entire length of the partition 2 and perpendicular to the external walls 32 and 34, and vertical partition elements 42 are provided that each extend between two horizontal and directly consecutive partition elements 40, and also perpendicular to the external walls 32 and 34. Thus, the cells 38 formed using these partition elements 40 and 42 may be approximately parallelepiped shaped, and have two openings (not referenced) facing the external walls 32 and 34 respectively.

Each of the partition elements 40 and 42 are in the form of a plate, for example made of aluminium or one of its alloys. Nevertheless, these elements 40 and 42 may be made from any other rigid material without going outside the scope of the invention. Each of the horizontal partition elements 40 may be composed simply of a plane approximately rectangular plate. On the other hand, each element of the vertical partition 42 is preferably composed of a flattened U-shaped plate with a plane approximately rectangular base that partially delimits the cells 38. Moreover, in this case, the two short flanges of the U are then used to fix the element 42 concerned, on the corresponding external walls 32 and 34, as can be seen clearly in FIG. 4. Obviously, the U-shape could be made using an assembly of several plates without going outside the scope of the invention.

Figure 5:
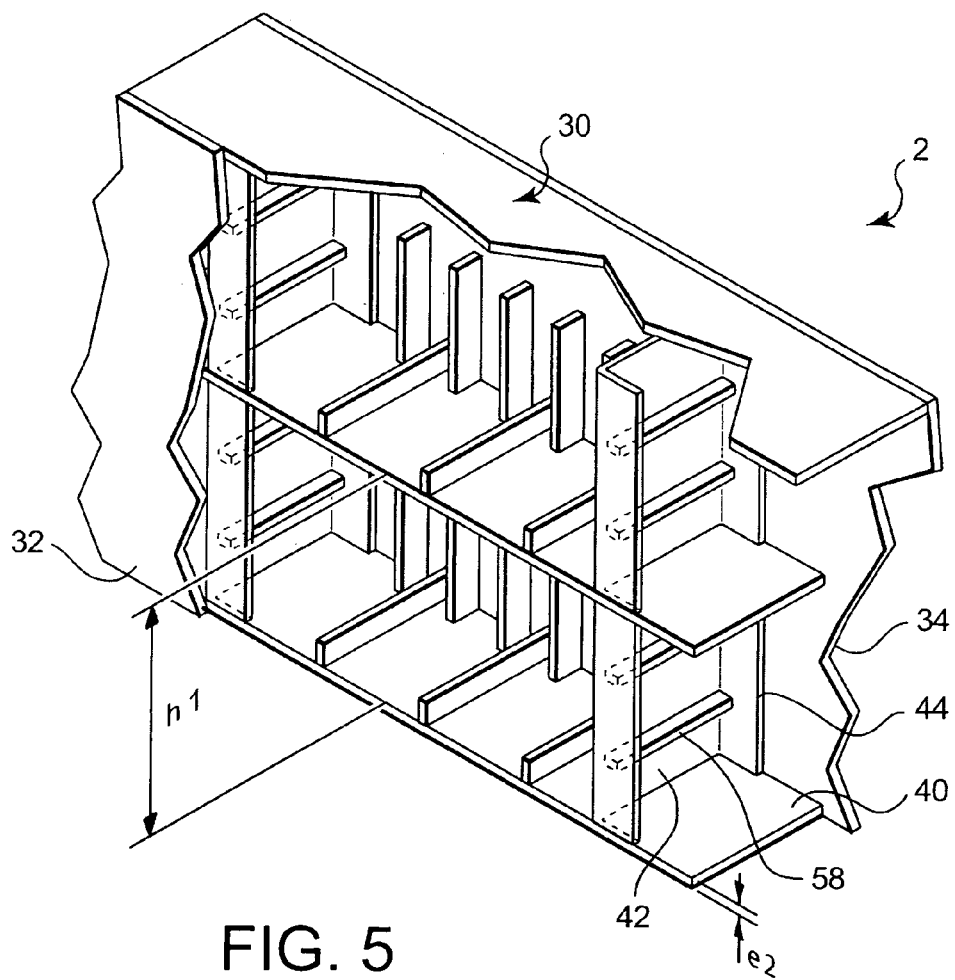
FIG. 5 shows a partial perspective view of the partition in FIG. 3, this partition being seen from plane V-V in FIG. 3.

As shown in FIG. 5, with this arrangement the elements of the horizontal partition 40 may be held in place simply by the flanges 44 of the U formed by each element of the vertical partition 42, without the need for them to be rigidly assembled to another part of the partition 2. Nevertheless, fixed links could also be provided between the horizontal partition elements 40 and the vertical partition elements 42, without going outside the scope of the invention. In this respect, note that the flanges 44 of the vertical partition elements 42 are preferably fixed to the external walls 32 and 34 by welding.

Referring to FIG. 2 again, it can be seen that the partition 2 comprises stiffener elements 46 installed fixed on an internal surface 48 of the external wall 34, for example by welding or by riveting. In other words, the stiffener elements 46 match the internal surface 48 corresponding to the surface of the external wall 34 facing it and in contact with the central cellular structure 30 and opposite an outside surface 49 of this same wall 34 on which the freight 6 may bear when it is accidentally detached from its storage location.

Preferably, each stiffener element 46 is in the form of a strip composed of an approximately rectangular plane plate, for example made from aluminium or one of its alloys. Nevertheless, these stiffener elements 46 could be made from any other rigid material without going outside the scope of the invention. Also preferably, all the strips 46 extend along the direction of the height of the partition 2 represented by the arrow 50. Thus, these strips 46 arranged vertically are arranged so as to define straight lines between the lower edge 28 and the upper edge 26, these straight and vertical lines being approximately parallel to each other and each being interrupted only by the horizontal partition elements 40 as can be seen in FIG. 2. As an illustrative example, it would be possible that between two and ten stiffener elements 46 could be fixed between two directly consecutive vertical partition elements 42, and that each of these stiffener elements could contribute to a straight line of stiffeners extending between the lower edge 28 and the upper edge 26 of the partition 2. Naturally, the arrangement and the number of stiffener elements 46 may easily be adapted to the needs encountered, so as to obtain a partition 2 that has sufficient mechanical strength to resist the maximum transported load, subjected to an acceleration equal to at least the maximum acceleration to which it may be subjected within the defined flight range for the aircraft concerned.

Figure 4:
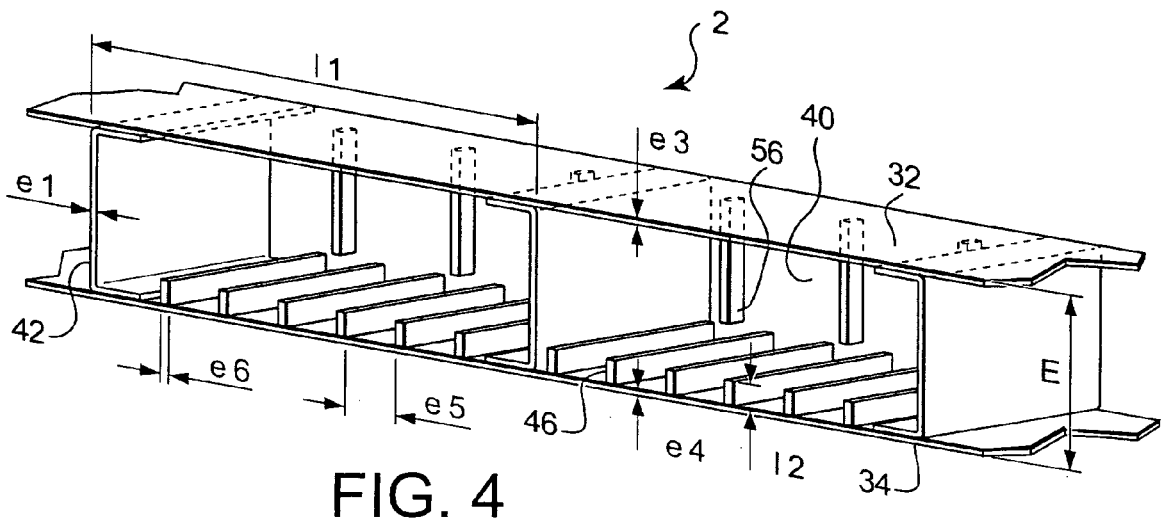
FIG. 4 shows a partial perspective view of the partition in FIG. 3, this partition being seen from plane IV-IV in FIG. 3.

As can be seen better in FIG. 4, the strip-shaped stiffener elements 46 made from plates are installed fixed to the internal surface 48, such that these plates are perpendicular to the external wall 34. In other words, the stiffener elements 46 are in contact with the internal surface 48 along their longitudinal edge.

It is also indicated that the partition 2 may possibly be provided with auxiliary plates 52,54 rigidly assembled around the periphery of this partition 2, particularly in order to close the cells 38 located at the ends of this same partition.

Moreover, in order to further reinforce the global mechanical strength of the partition 2 and therefore to be able to reduce its total mass, it is possible to provide secondary stiffener elements 56,58 fixed onto the horizontal partition elements 40 and the vertical partition elements 42, as can be seen in FIGS. 4 and 5.

These secondary stiffener elements 56 and 58 may be similar to the stiffener elements 46 described above, and are preferably placed perpendicular to the external walls 32 and 34, and therefore horizontally on partition elements 40 and 42 to prevent these elements from buckling when the freight 6 applies forces by bearing on the external wall 34.

Figure 3:
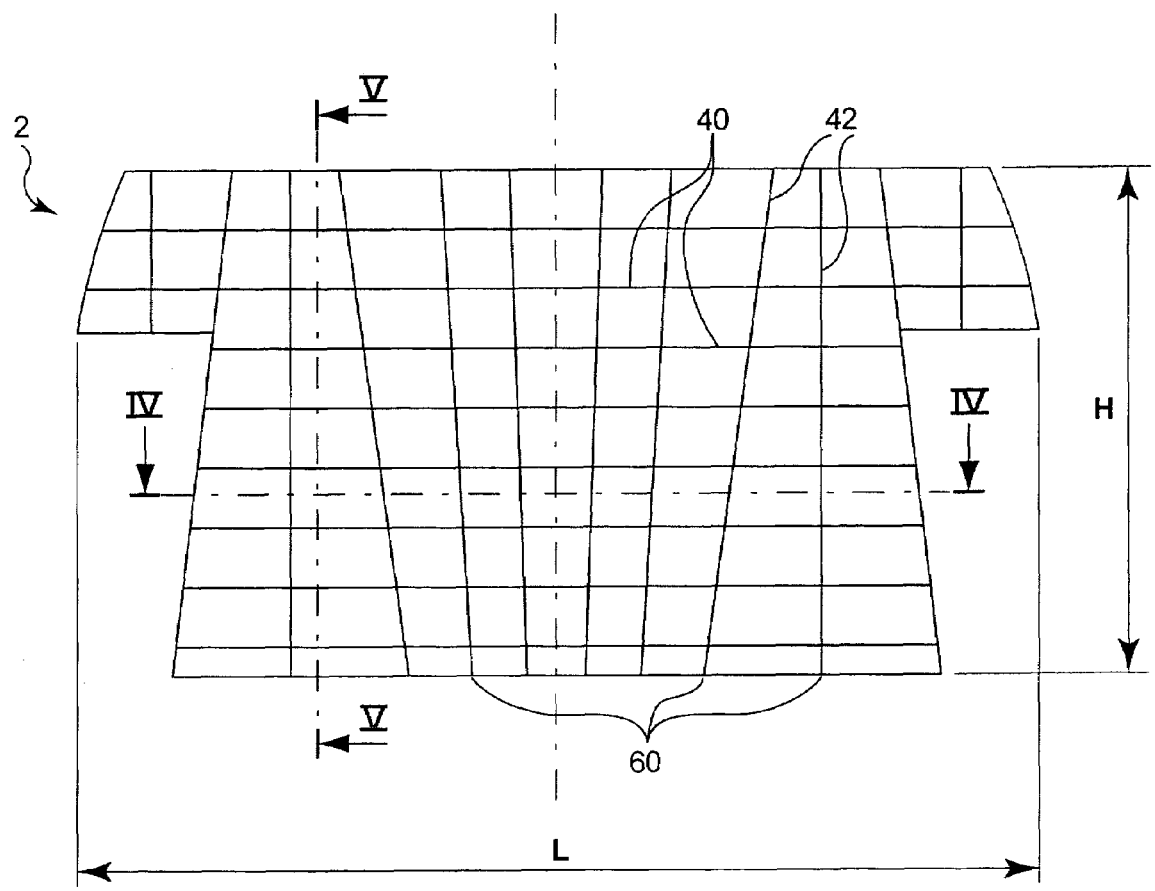
FIG. 3 shows a diagrammatic front view of the partition shown in FIGS. 1 and 2.

Now with reference to FIG. 3, it can be seen that the horizontal partition elements 40 are actually positioned horizontally and parallel to each other. On the other hand, to improve the mechanical strength of the partition 2, it may be preferable for the so-called "vertical" partition elements 42 to form the walls 60 between the edges 26 and 28, some of which are slightly inclined from the vertical, in a fictitious plane defined by the partition 2. However, note that the concept of verticality associated with partition elements 42 is justified in the sense that the inclination of the walls 60 obtained does not usually exceed a few degrees.

A preferred example embodiment of the partition 2 is given with reference to the dimensions indicated in FIGS. 3, 4 and 5.

Height "H" of the partition 2: 2578 mm
Length "L" of the partition 2: 4900 mm
Thickness "E" of the partition 2: 356 mm
Width "l1" of cells 38: 511 mm
Thickness "e1" of the vertical partition elements 42: 5.7 mm
Thickness "e2" of the horizontal partition elements 40: 1.5 mm
Thickness "e3" of the external wall 32: 3.7 mm
Thickness "e4" of the external wall 34: 2.2 mm
Height "h1" of cells 38: 295 mm
Spacing "e5" between the stiffener elements 46: 51 mm
Thickness "e6" of the stiffener elements 46: 3.3 mm
Width "l2" of the stiffener elements 46: 23 mm
Number of stiffener elements 46 in each cell 38: about 7 (only some of them are shown in FIG. 4)
Material used for external walls 32 and 34, partition elements 40 and 42, stiffener elements 46 and secondary stiffener elements 56 and 58: Aluminium 7075
Mass per unit area of the partition 2: 28 kg/m$^2$
Global mechanical strength of the partition 2: 0.7 MPa Obviously, those skilled in the art could make various modifications to the aircraft 1 and to the partition 2 that have just been described solely as non-limitative examples.

The invention claimed is:

1. A partition for an aircraft designed to separate a cargo part from a cockpit or a passenger compartment of said aircraft, said partition comprising a cellular central structure in contact with a first external wall and a second external wall of said partition, said cellular central structure including partition elements each in the form of a plate and arranged approximately parallel to and perpendicular to each other, said partition elements forming cells each having two openings facing said first and second external walls, respectively, wherein said partition also comprises several stiffener elements added onto at least one of said first and second external walls, wherein said partition elements are not coplanar with said stiffener elements, and said stiffener elements extend substantially continuously, along at least one straight line, over substantially the entire height of said partition.

2. A partition for an aircraft according to claim 1, wherein each of said first and second external walls is in the form of a plane plate.

3. A partition for an aircraft according to claim 1 or to claim 2, wherein each stiffener element is in the form of a strip installed on one of said first and second external walls.

4. A partition for an aircraft according to claim 1, wherein each stiffener element extends approximately along the direction of the height of said partition, matching one of said first and second external walls.

5. A partition for an aircraft according to claim 1, wherein each stiffener element is installed on an internal surface of one of said first and second external walls of said partition.

6. A partition for an aircraft according to claim 1, further comprising at least one secondary stiffener element added onto at least one of said partition elements.

7. A partition for an aircraft according to claim 1, wherein said partition is made from aluminium or one of its alloys.

8. An aircraft comprising a fuselage and at least one partition separating a cargo part from a cockpit or a passenger compartment within said fuselage of said aircraft, wherein at least one partition separating a cargo part from the cockpit or a passenger compartment is a partition according to claim 1.

9. An aircraft according to claim 8, wherein said at least one partition is fixed to the fuselage of said aircraft only by an upper edge and a lower edge of said partition.

10. A partition for an aircraft according to claim 1, wherein said first and second external walls are parallel to each other and said cellular central structure is between said first and second external walls.

11. A partition for an aircraft according to claim 10, wherein a first plurality of said partition elements includes horizontal partition elements and a second plurality of said partition elements includes vertical partition elements, and wherein said horizontal and vertical partition elements are perpendicular to said first and second external walls.

12. A partition for aircraft according to claim 11, wherein a first plurality of said stiffener elements are fixed to an internal surface of said first external wall such that said stiffener elements of said first plurality are between said first and second external walls.

13. A partition for aircraft according to claim 12, wherein a second plurality of said stiffener elements are fixed to an internal surface of said second external wall such that said stiffener elements of said second plurality are between said first and second external walls.

14. A partition for aircraft according to claim 12, further comprising secondary stiffener elements fixed to said horizontal and vertical partition elements.

15. A partition for aircraft according to claim 11, wherein said vertical partition elements are U-shaped and have flanges that are fixed to said first and second external walls.

16. A partition for aircraft according to claim 11, wherein said horizontal partition elements extend from said first wall to said second external wall.

17. A partition for aircraft according to claim 11, wherein said stiffener elements are aligned with each other from one cell to another adjacent cell of said cellular central structure.

* * * * *